(12) United States Patent
Kampel et al.

(10) Patent No.: US 8,160,512 B2
(45) Date of Patent: Apr. 17, 2012

(54) SEARCHING APPARATUS AND METHOD FOR OPERATING A SEARCHING APPARATUS

(76) Inventors: Gerald Kampel, Taufkirchen (DE); Rolf Matzner, Schondorf (DE)

( * ) Notice: Subject to any disclaimer, the term of this patent is extended or adjusted under 35 U.S.C. 154(b) by 624 days.

(21) Appl. No.: 12/336,148

(22) Filed: Dec. 16, 2008

(65) Prior Publication Data

US 2009/0163150 A1    Jun. 25, 2009

(30) Foreign Application Priority Data

Dec. 19, 2007  (EP) ..................................... 07123634

(51) Int. Cl.
*H04B 1/38* (2006.01)
(52) U.S. Cl. .................... 455/90.1; 455/456.1
(58) Field of Classification Search .............. 455/90.1, 455/456.1; 701/200–205
See application file for complete search history.

(56) References Cited

U.S. PATENT DOCUMENTS

| | | | | |
|---|---|---|---|---|
| 6,020,849 | A * | 2/2000 | Fukuzaki ...................... | 342/374 |
| 6,484,021 | B1 * | 11/2002 | Hereford et al. ............ | 455/404.1 |
| 6,960,996 | B2 * | 11/2005 | Sackl ......................... | 340/539.11 |
| 7,612,717 | B2 * | 11/2009 | Daniele et al. .............. | 342/465 |

FOREIGN PATENT DOCUMENTS

| | | |
|---|---|---|
| DE | 101 09 284 A1 | 3/2003 |
| DE | 10 2004 027 314 A1 | 10/2005 |
| EP | 0 733 916 A2 | 12/1998 |
| EP | 1 439 400 A2 | 7/2004 |
| EP | 1 626 379 A2 | 2/2006 |
| EP | 1 785 169 A1 | 11/2006 |

\* cited by examiner

*Primary Examiner* — Brian Young
(74) *Attorney, Agent, or Firm* — Fitch, Even, Tabin & Flannery, LLP

(57) ABSTRACT

A searching apparatus, especially an avalanche transceiver, including a receiving unit (22) for receiving transmission signals for locating a transmitter and a transmitting unit (20) for transmitting transmission signals, wherein at least a first (10) and a second transmitting antenna (12) are associated with at least the transmitting unit (20), which are disposed in the searching apparatus oriented in different spatial directions, wherein only one of the transmitting antennas (10; 12) is in operation in the transmission mode, wherein the searching apparatus further includes: at least one position sensor (28) adapted to determine a spatial position of the searching apparatus and to provide a position signal on its output, which is correlated with the spatial position; and a switching device (16) coupled to the at least one position sensor (28) for supplying the position signal on the one hand and to the at least one first (10) and second transmitting antenna (12).

14 Claims, 1 Drawing Sheet

SEARCHING APPARATUS AND METHOD FOR OPERATING A SEARCHING APPARATUS

Figure 1:
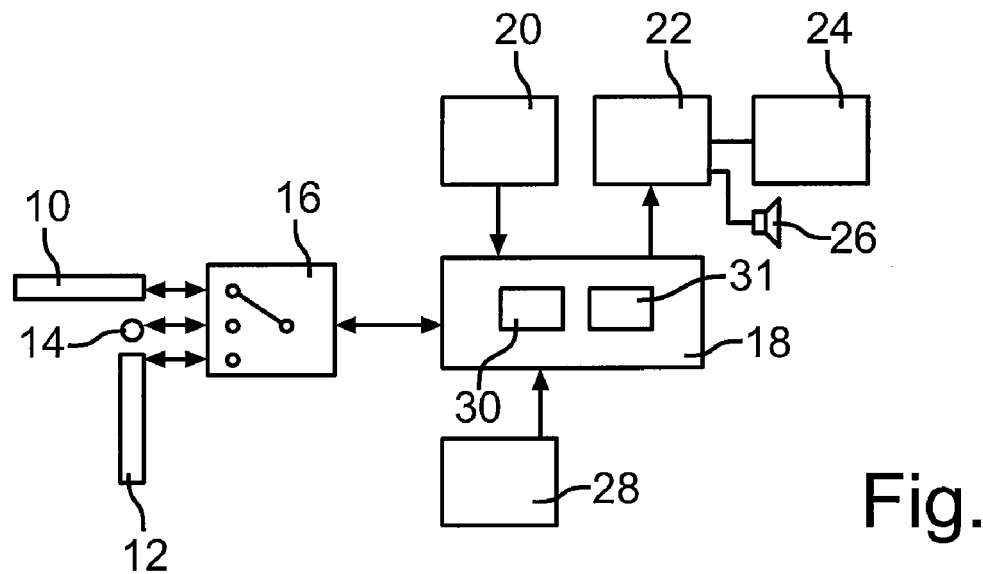

The present invention relates to a searching apparatus, especially an avalanche transceiver, including a receiving unit for receiving transmission signals for locating a transmitter and a transmitting unit for transmitting transmission signals, wherein at least a first and a second transmitting antenna are associated with at least the transmitting unit, which are disposed in the searching apparatus oriented in different spatial directions, wherein only one of the transmitting antennas is in operation in the transmission mode. Moreover, it relates to a method for operating a corresponding searching apparatus.

Such a searching apparatus and such a method are known from the EP 1 439 400 A2. In practice, in such searching apparatuses, again and again, cases occur in which the searching apparatus only receives a transmission signal at distances of less than 20 m from the victim buried alive, and thus the location of the victim buried alive can be initiated. Therefore, in order to ensure that the victim buried alive is found, an individual searcher would have to go over the avalanche field in searching such that the distance of a searching stripe to the border of the avalanche field is maximum 10 m and the distance between the searching stripes is adapted to this "worst case", i.e. is maximum 20 m. With plural searchers, the searchers would have to scan the avalanche field in a straight line in a distance to each other, which is also adapted to this "worst case", i.e. also maximum 20 m.

The object of the present invention is to develop a searching apparatus or a method of the initially mentioned type, respectively, such that thereby the distance of the searching stripes can be increased in case of an individual searcher or the distance of searchers to each other can be increased in case of plural searchers, respectively.

This object is solved by a searching apparatus having the features of claim 1 and by a method having the features of claim 10, respectively.

First, the present invention is based on the realization that the same antenna is always used as the transmitting antenna in the known searching apparatuses. If this antenna comes to lie in horizontal position at the victim buried alive by an avalanche, a majority of the field lines emanating from the transmitting antenna passes through the usually horizontally held antenna of the searching apparatus of the searcher. This would allow a distance of the searching stripes of nearly two times the distance in known searching apparatuses. However, there arise problems if the transmitting antenna of the buried searching apparatus comes to lie in vertical orientation. Then, a majority of the field lines emanating from the transmitting antenna namely passes perpendicularly through the receiving antenna of the searching apparatus of the searcher. Thereby, reception levels of merely very low field strength are produced. Therefore, it is to be assumed that the last-mentioned constellation is responsible for the dimensioning of the distance of the searching stripes or the searchers in the prior art, respectively.

Furthermore, the present invention is now based on the realization that in generic searching apparatuses there are already plural antennas oriented in different spatial directions, between which it is switched to and from in reception, i.e. in searching mode. While always the same transmitting antenna is employed in the prior art independently of the position of the buried searching apparatus, in a searching apparatus according to the invention, now, the transmitting antenna is used for transmission depending on position, which takes the more beneficial position. The more beneficial position is characterized in that higher field strength can be produced with a horizontally held searching apparatus of the searcher with the transmitting antenna located in the more beneficial position than with the other or one of the other transmitting antennas.

Therefore, a searching apparatus according to the invention further includes at least one position sensor configured to determine a spatial position of the searching apparatus and to provide a position signal on its output, which is correlated with the spatial position, as well as a switching device coupled to the at least one position sensor for supplying the position signal on the one hand and to the at least one first and second transmitting antennas on the other hand. Therein, a first range of values of the position signal is associated with the first transmitting antenna and a second range of values of the position signal is associated with the second transmitting antenna, wherein the switching device is adapted to transmit the transmission signal over the first transmitting antenna in the transmission mode, if the position signal is in the first range of values, and to transmit the transmission signal over the second transmitting antenna in the transmission mode, if the position signal is in the second range of values. The ranges of values can be measured and determined from the manufacturer side. Then, preferably, they are stored in a storage device of the searching apparatus.

The invention allows to nearly double the distance of the searching stripes or the distance of the searchers, respectively. Thereby, the time for searching a victim buried alive can be nearly halved. This results in great increase of the probability of survival of the victim buried alive or the victims buried alive, respectively.

A preferred embodiment of a searching apparatus according to the invention is characterized in that the searching apparatus further includes a third transmitting antenna, with which a third range of values of the position signal is associated, wherein the switching device is adapted to transmit the transmission signal over the third transmitting antenna, if the position signal is in the third range of values. This measure accounts for the circumstance that in the prior art searching apparatuses are known in the meantime, which have three antennas, but wherein they are only used for reception in the prior art, and only one of them, always the same one, is used for transmission. Even if the third antenna is usually formed appreciably shorter, mostly half as large, than the other two antennas, constellations are conceivable, in which such a third antenna promises the greatest transmission success.

Preferably, at least the first and the second transmitting antenna are disposed orthogonally to each other. However, the transmitting antennas can take any position with respect to each other to realize the success according to the invention, if they are just oriented in different spatial directions. Thus, constellations are known, in which two antennas are disposed X-shaped to each other, wherein the angle made by the antennas is equal or also unequal to 90°.

Preferably, the position sensor includes a magnetic field sensor, especially a three-dimensional magnetic field sensor, for evaluating the earth magnetic field for determining the position of the searching apparatus. In the meantime, searching apparatuses have become known, for example from DE 10 2004 027 314 B4, which include a magnetic field sensor, but which is there used for associating a searching angle relatively to the earth magnetic field with each received transmission signal in searching for a victim buried alive. Such a magnetic field sensor already present can now experience an advantageous application also in the transmission mode.

Alternatively or additionally, the position sensor can include at least one inclination sensor, especially at least one two-axis inclination sensor, for determining the position of the searching apparatus. From the mentioned DE 10 2004 027 317 B4, the use of inclination sensors is also known, but which are used there to determine the inclination of the searching apparatus in associating a searching angle with each received transmission signal relatively to the earth magnetic field.

Alternatively or additionally, the position sensor can have at least one acceleration sensor and/or a gyro sensor for determining the position of the searching apparatus.

In a preferred embodiment, the first transmitting antenna is disposed in the longitudinal direction of the searching apparatus and the second transmitting antenna is disposed in the transverse direction of the searching apparatus, wherein a position of the searching apparatus with an inclination of the searching apparatus of less than or equal to 30°, preferably less than or equal to 20°, with respect to the vertical is associated with the second range of values. An exact determination of the angle from which it should be switched from the first to the second transmitting antenna, is preferably determined on the manufacturer side. With three transmitting antennas, the inclination and tilt angle is correspondingly to be specified.

A method according to the invention is characterized in that in a first step, first, the spatial position of the searching apparatus is determined, and subsequently, in a second step, the transmission signal is transmitted over the transmitting antenna, with which the spatial position determined in the first step is associated.

In a preferred embodiment of the method according to the invention, however, the following steps are performed beforehand. First, the spatial position of the searching apparatus is determined over a presettable time period. Therein, the absolute spatial position or the relative spatial position, thus spatial position variations, can be determined. The latter allows a simpler processing of the signals arising therein. If a presettable threshold value is not exceeded in determination of the spatial position, this is an indication that the case of burial is present, i.e. the victim buried alive moves not at all or at least only very slightly with the searching apparatus. Only in this case, then, the steps of the method according to the invention are performed. This preferred embodiment has the advantage that switching of the transmitting antenna is only made in the case of burial. Permanent switching of the transmitting antenna due to improper carriage of a searching apparatus according to the invention is reliably avoided thereby. The presettable time period is preferably in the range of few seconds up to one minute.

The preferred embodiments presented with respect to the searching apparatus according to the invention and the advantages thereof also apply to the method according to the invention, if applicable.

Figure 2:
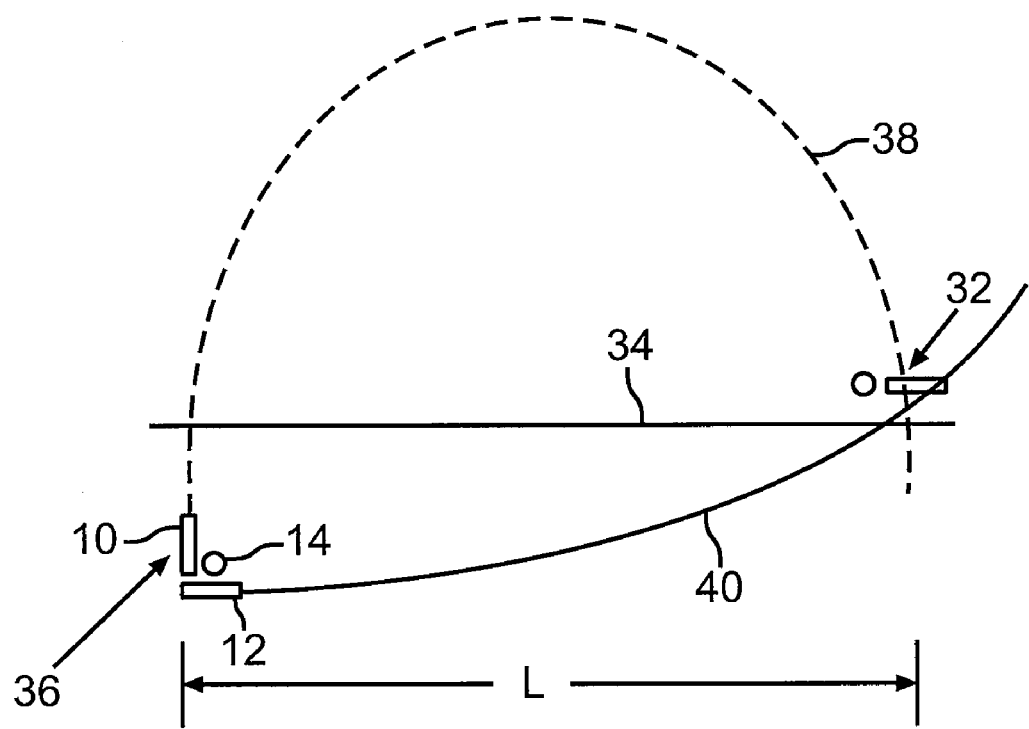

In the following, an embodiment of a searching apparatus according to the invention is now described in more detail with reference to the attached drawings. There show:

FIG. 1 in schematic representation the construction of a searching apparatus according to the invention; and FIG. 2 in schematic representation the employment of a searching apparatus according to the invention in searching for a person buried in an avalanche.

FIG. 1 shows in schematic representation the construction of an embodiment of a searching apparatus according to the invention. It has a first 10, a second 12 and a third antenna 14. By means of a switch 16, it can be switched between the three antennas 10, 12, 14 in the reception and transmission mode. The searching apparatus according to the invention has a microcontroller 18 coupled to a transmitting unit 20 and a receiving unit 22. The transmitting unit 20 includes a transmitting oscillator not represented, which is particularly adapted to generate a signal with a frequency of 457 kHz. The receiving unit 22 is coupled to a display unit 24, for example a LED display, as well as a loudspeaker 26 in known manner. The microprocessor 18 is further coupled to a position sensor 28 which may include a magnetic field sensor, especially a three-dimensional magnetic field sensor, for evaluating the earth magnetic field for determining the position of the searching apparatus. Alternatively or additionally, it can include at least one inclination sensor, especially two or three inclination sensors, for determining the position of the searching apparatus. The microprocessor 18 has a storage means 30, in which a first range of values of a position signal provided by the position sensor 28 as well as a second range of the position signal are stored. If the microprocessor 18 determines by way of the position signal provided by the position sensor 28 that the position signal is in a first range of values, thus it drives the switch 16 such that the transmitting antenna 10 is used in the transmission mode. On the contrary, if the position signal is in a second range of values, the microprocessor 18 drives the switch 16 such that the transmitting antenna 12 is used for transmitting the transmission signal. In an embodiment not illustrated, it can be provided that one of the three antennas 10, 12, 14 is selected for transmitting the transmission signal depending on the ranges of values stored in the storage device 30.

In the embodiment of FIG. 1, the antenna 10 is disposed in the longitudinal direction of the searching apparatus and the antenna 12 is disposed in the transverse direction of the searching apparatus. Therein, a range of values is associated with the antenna 12, with which a position of the searching apparatus with an inclination of the searching apparatus of less than or equal to 30°, preferably less than or equal to 20°, with respect to the vertical is associated.

In the embodiment of FIG. 1, the searching apparatus further has a time measuring device 31. This allows preventing permanent switching of the transmitting antenna with improper carriage of a searching apparatus according to the invention. Therein, it is checked if the spatial position, relative or absolute, is stable over a presettable time period, i.e. the variations do not exceed a presettable limit value. If this is the case, this represents a strong indication that the case of burial is present, in which the victim buried alive and thus the searching apparatus cannot move anymore or at least can hardly move anymore. Only then, if this case has been recognized, the absolute spatial position of the searching apparatus is determined and it is switched to the transmitting antenna, with which this spatial position is associated.

FIG. 2 shows in schematic representation the situation in searching for a victim buried alive. The searcher 32 has a searching apparatus having two receiving antennas aligned parallel to the surface of an avalanche searching field 34. The victim buried alive 36 disposes of a searching apparatus according to the invention, wherein the antenna 10 usually used for transmitting in the prior art has come to lie in vertical position in the avalanche. If this antenna 10 is used for transmitting a transmission signal, field lines result, of which the field line 38 is exemplarily illustrated. It passes the receiving antenna of the searching apparatus of the searcher 32 nearly perpendicularly and therefore only generates a very small field strength signal. However, since the searching apparatus of the victim buried alive 36 is inclined by less than 30° with respect to the vertical, according to the invention, not the antenna 10, but the antenna 12 is used for transmitting the transmission signal. It generates field lines in the transmission mode, of which the field line 40 is exemplarily drawn. As clearly appreciated, it passes the receiving antenna of the searching apparatus of the searcher 32 in a substantially smaller angle and therefore results in generation of a field strength signal of substantially greater amplitude than in the case of the field line 38. While the distance L drawn in FIG. 2 is allowed to be maximum 20 m upon evaluation of the field line 38 to result in an indication on the searching apparatus of the searcher 32, the distance L can be about 40 m upon evaluation of the field line 40 to result in an indication on the searching apparatus of the searcher 32.

The invention claimed is:

1. A searching apparatus comprising:
   a receiving unit configured to receive transmission signals for locating a transmitter;
   a transmitting unit configured to transmit transmission signals, wherein at least a first and a second transmitting antenna are associated with at least the transmitting unit, which are disposed in the searching apparatus oriented in different spatial directions, wherein only one of the transmitting antennas is in operation in the transmission mode,
   at least one position sensor configured to determine a spatial position of the searching apparatus and to provide a position signal on its output which is correlated with the spatial position; and
   a switching device coupled to the at least one position sensor for supplying the position signal to the at least one first and second transmitting antenna,
   wherein a first range of values of the position signal is associated with the first transmitting antenna and a second range of values of the position signal is associated with the second transmitting antenna, wherein the switching device is configured to transmit the transmission signal over the first transmitting antenna in the transmission mode, if the position signal is in the first range of values, and to transmit the transmission signal over the second transmitting antenna in the transmission mode, if the position signal is in the second range of values.

2. The searching apparatus according to claim 1, wherein the searching apparatus further includes a third transmitting antenna with which a third range of values of the position signal is associated, and wherein the switching device is configured to transmit the transmission signal over the third transmitting antenna if the position signal is in the third range of values.

3. The searching apparatus according to claim 1, wherein at least the first and the second transmitting antenna are disposed orthogonally to each other.

4. The searching apparatus according to claim 1, wherein the position sensor includes a magnetic field sensor for evaluating the earth magnetic field for determining the position of the searching apparatus.

5. The searching apparatus according to claim 1, wherein the position sensor includes at least one inclination sensor for determining the position of the searching apparatus.

6. The searching apparatus according to claim 1, wherein the position sensor includes at least one acceleration sensor for determining the position of the searching apparatus.

7. The searching apparatus according to claim 1, wherein the position sensor includes at least one gyro sensor for determining the position of the searching apparatus.

8. The searching apparatus according to claim 1, wherein the first transmitting antenna is disposed in the longitudinal direction of the searching apparatus and the second transmitting antenna is disposed in the transverse direction of the searching apparatus, wherein a position of the searching apparatus with an inclination of the searching apparatus of less than or equal to 30° with respect to the vertical is associated with the second range of values.

9. The searching apparatus according to claim 1, wherein the searching apparatus further includes a time measuring device, wherein the searching apparatus is configured to determine the spatial position variations of the searching apparatus over a presettable time period and to compare them against a presettable limit value.

10. A method for operating a searching apparatus including a receiving unit for receiving transmission signals for locating a transmitter and a transmitting unit for transmitting transmission signals, wherein at least a first and a second transmitting antenna are associated with at least the transmitting unit, the first and second transmitting antennas disposed in the searching apparatus oriented in different spatial directions, wherein only one of the transmitting antennas is in operation in a transmission mode, the method comprising:
   determining a spatial position of the searching apparatus with a position sensor;
   providing a position signal from the position sensor, the position signal correlated with the spatial position of the searching apparatus;
   receiving the position signal at a switching device that associates a first range of values with the first transmitting antenna and a second range of values with the second transmitting antenna;
   transmitting a transmission signal only over the first transmitting antenna in the transmission mode if the received position signal is in the first range of values, or transmitting a transmission signal only over the second transmitting antenna in the transmission mode if the received position signal is in the second range of values.

11. The method according to claim 10, further comprising:
   determining the spatial position variations of the searching apparatus over a presettable time period; and
   if the spatial position variations do not exceed a presettable threshold value within the presettable time period transmitting the transmission signal only over the first transmitting antenna in the transmission mode if the received position signal is in the first range of values, or transmitting the transmission signal only over the second transmitting antenna in the transmission mode if the received position signal is in the second range of values.

12. The searching apparatus according to claim 4, wherein the magnetic field sensor is a three-dimensional magnetic field sensor.

13. The searching apparatus according to claim 5, wherein the at least one inclination sensor is a two-axis inclination sensor.

14. The searching apparatus according to claim 8, wherein a position of the searching apparatus with an inclination of the searching apparatus of less than or equal to 20° with respect to the vertical is associated with the second range of values.

* * * * *